(12) United States Patent
Reed

(10) Patent No.: US 6,423,936 B1
(45) Date of Patent: Jul. 23, 2002

(54) WELDING APPARATUS

(76) Inventor: Edward Reed, 5 Brynaeron Court, Dunvant, Swansea (GB)

( * ) Notice: Subject to any disclaimer, the term of this patent is extended or adjusted under 35 U.S.C. 154(b) by 0 days.

(21) Appl. No.: 09/611,122

(22) Filed: Jul. 6, 2000

(51) Int. Cl.[7] .............................................. B23K 9/173
(52) U.S. Cl. ................................... 219/130.21; 219/74
(58) Field of Search ..................... 219/74, 75, 130.21, 219/130.31, 130.32, 130.33, 137 PS

(56) References Cited

U.S. PATENT DOCUMENTS

| 4,100,390 A | 7/1978 | Jackson | 219/74 |
| 4,278,864 A | * 7/1981 | Facci et al. | 219/74 |
| 4,521,671 A | * 6/1985 | Fronius | 219/130.31 |

FOREIGN PATENT DOCUMENTS

| EP | 15809 A2 | 2/1994 |
| JP | 8294777 | 11/1996 |

* cited by examiner

*Primary Examiner*—Clifford C. Shaw
(74) *Attorney, Agent, or Firm*—Christopher P. Maiorana, P.C.

(57) ABSTRACT

A pressure sensor is arranged to sense the pressure of a pressurized welding gas and produce a variable control output dependent upon the pressure level sensed. A control signal is initiated in response to pressure of a predetermined level being sensed, the control signal being passed to the welding apparatus driver circuitry to inhibit the welding operation.

10 Claims, 3 Drawing Sheets

WELDING APPARATUS

The present invention relates to welding apparatus and in particular to control of welding operations in which gas is supplied to the welding none such as for example in gas 'shielding' or gas 'purging' operations.

Pressurised inert gas is frequently utilised in welding techniques to produce a preferred welding environment in which oxidization is inhibited in the weld and/or an optimum weld is produced by minimising porosity or other defects in the weld. Gas 'purging' is a technique in which an inert gas is directed to provide an inert atmosphere on the under side of a weld.

Gas shielded arc welding is also a well known process in which the welding arc and the molten weld metal are protected from ambient air by means of a shielding gas or mixture of gases which may be inert (for example, argon or helium). Two varieties of the process using an inert gas are common, these being known as "Tungsten Inert Gas" (TIG) and Metal Inert Gas (MIG). In TIG welding, the arc and a workpiece to be welded, whereas in MIG welding, the arc is maintained between a filler wire and the workpiece. When using an oxidizing gas, the process is known as metallic active gas (MAG). Combinations of inert gas and oxidizing gas are also possible.

Such welding processes rely upon a consistent supply of shielding gas to the welding zone. It has been found that there can be problems if the gas supply is interrupted, or, when a bottle or cylinder of gas reaches exhaustion. This can cause undesirable porosity to be formed in the weld when the gas shield is breached.

This problem is addressed in EP-A-0615809 which discloses a mechanical sensor a switch when the gas pressure falls below a predetermined threshold; opening the switch cuts off the welding wire advancing deice and the voltage source. The threshold at which the gas cut off occurs is determined by the spring constant of a biasing spring comprising the mechanical sensor.

Improved apparatus has now been devised.

According to a first aspect, the present invention provides welding control apparatus including:

i) a pressure sensor arranged to sense the pressure of a pressurised welding gas and produce a variable control output dependent upon the pressure level sensed;

ii) output connections for electrical connection to welding apparatus deliver means; and, iii) control means for initiating a control signal to pass via the output driver connections when pressure of a predetermined level is sensed by the pressure sensor.

Because the output produced by the pressure sensor is variable to have a range between a maximum and a minimum, the predetermined level at which the control signal is initiated by the control means is variable over a range between a maximum and a minimum. This enables the gas pressure level at which the welding apparatus power supply to the driver means is cut to be varied. The control means preferably includes adjustment means for adjusting (preferably manually) the predetermined gas pressure level at which the control signal is initiated by the control means.

The apparatus can therefore be adapted to retro-fit a wide variety of different types of welding machines and apparatus in view of the fact that the pressure sensor output is variable. The adaptability of the control apparatus is further enhanced by providing a variable voltage regulator permitting connection to a range of welding apparatus voltage supplies. According to a second aspect, the invention therefore provides a retro-fit unit for connection to welding apparatus.

The adjustment means for adjusting the predetermined gas pressure level at which the control signal is initiated by the control means is preferably accessible from externally of the apparatus. The variable voltage regulator is preferably accessible from externally of the apparatus.

The pressure sensor preferably comprises an electronic pressure transducer arranged to produce a variable electronic output dependant upon the pressure sensed.

The electronic transducer comprises a thin film and diaphragm pressure transducer.

Desirably, the control means is arranged to initiate an output control signal as respective lower and upper threshold levels. This enables the welding driver means to be de-activated if gas at excess pressure is being delivered to the welding zone.

The apparatus preferably further comprises a conduit for the welding gas, the conduit being in communication with the pressure sensor.

The apparatus preferably comprises a connector having:

i) and inlet for pressurized welding gas;

ii) a plurality of outlets for pressurized welding gas.

According to a further aspect, the invention provides welding apparatus comprising:

(a) a supply of pressurized gas;

(b) a welding gun having an electrical power supply (c) means for supplying welding filler material to the gun; and, (d) a control arrangement including:

(i) a pressure sensor arranged to sense the pressure of the pressurized welding gas and produce a variable control output dependent upon the pressure level sensed;

(ii) output connections for electrical connection to welding gun power supply; and (iii) control means for initiating a control signal when pressure of a predetermined level is sensed by the pressure sensor resulting in modification of the power status of the welding gun.

According to a further aspect, the invention provides welding apparatus comprising a connector having:

i) an inlet port for connection to a welding gas supply;

ii) a first outlet communicating with the inlet and arranged to enable welding gas to be delivered to a first location; and iii) a second outlet communicating with the inlet and arranged to enable welding gas to be delivered to a second location.

A removable plug is preferably provided for at least one of the first and second outlet.

In use, with the plug in position closing one of the outlets, gas may be delivered from the gas supply to perform the 'shielding' function. With the plug removed gas may be directed simultaneously via both outlets to perform simultaneous 'purging ' and 'shielding' functions.

The invention will now be further described by way of example only, and with reverence to the accompanying drawings in which.

Figure 1:
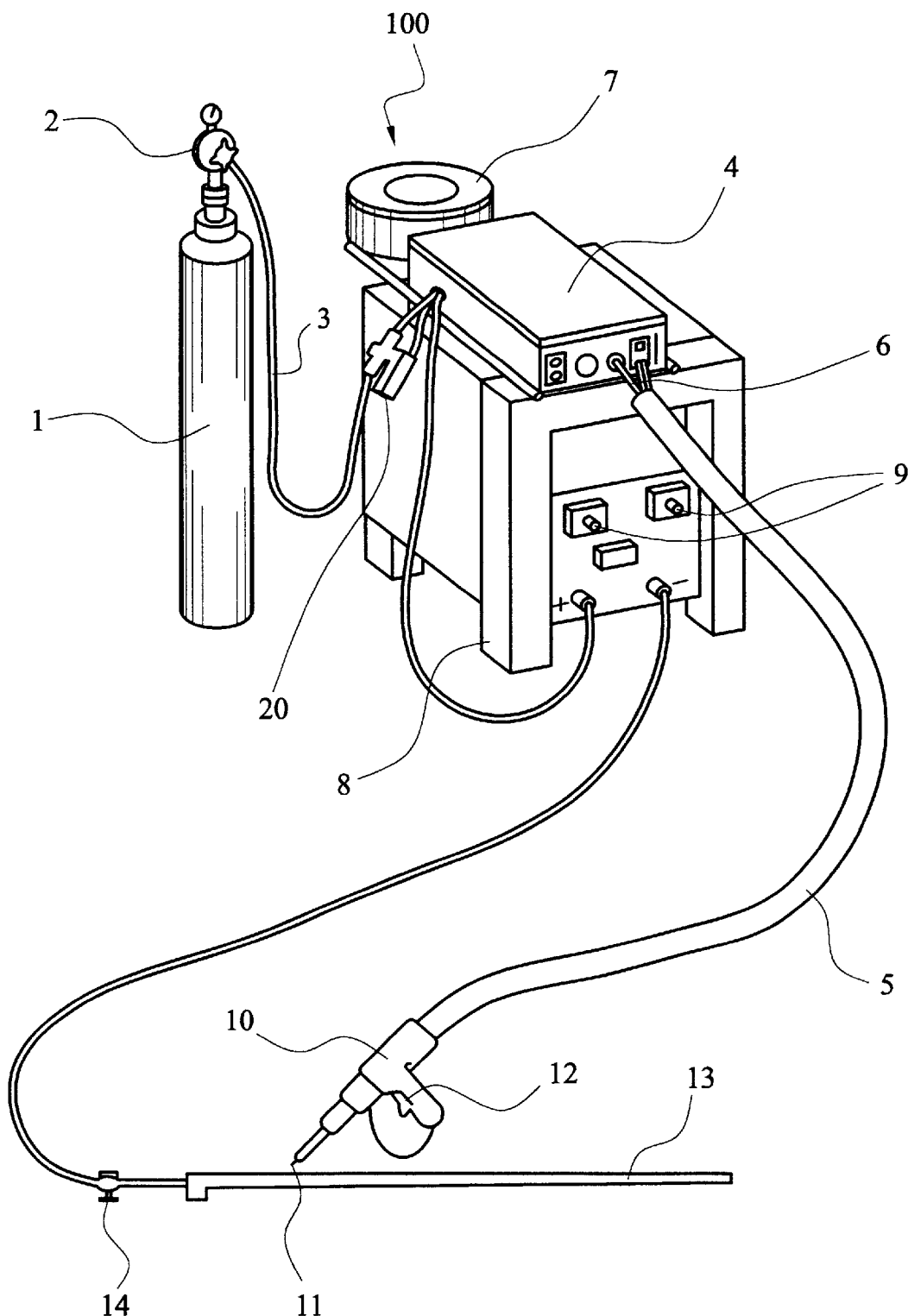
FIG. 1, is a perspective view of apparatus according to the invention.

Referring to FIG. 1, there is shown MIG welding apparatus, generally designated 100. A gas cylinder 1, for supplying inert gas has a conventional regulator 2, and connected thereto a gas line 3 which extends into a welding wire feed and master control/driver unit 4 to a further conduit 5. Also passing along conduit 5 is wire 6, fed from a filler wire spool 7; the filler wire passes through the wire feed and control unit and along conduit 5.

The control unit also includes a power unit 8, together with gauges 9 for the power unit.

The filler wire passes along the conduit to a welding gun 10, and thence to a nozzle 11; the gun itself is controlled via a trigger type switch 12 to control the driver to feed the wire 6 and energise the electrical supply.

The wire 6 is fed through the nozzle to a workpiece 13, to which is secured an earth clamp 14. Simultaneously, a gas shroud is created around the wire electrode, the gas being fed from gas cylinder 1.

Within the gas supply line 3, upstream of wire feed and control unit 4, is located a regulator control unit 20 (see FIG. 2) which is arranged to act as a regulator permitting the welding apparatus to be operable provided the gas pressure in supply line 3 (and hence delivered to the workpiece 13) remains within predetermined threshold limits. The regulator is arranged to shut off the welding apparatus by disabling the driver unit 4 components feeding the wire 6 and/or disconnecting the electrical supply. Causing the power supply to feed wire 6 to be tripped-out or cut off, ensures that the arc at the tip of the wire at 15 is extinguished. This ensures that porosity which might otherwise result in the weld is thereby alleviated.

Figure 2:
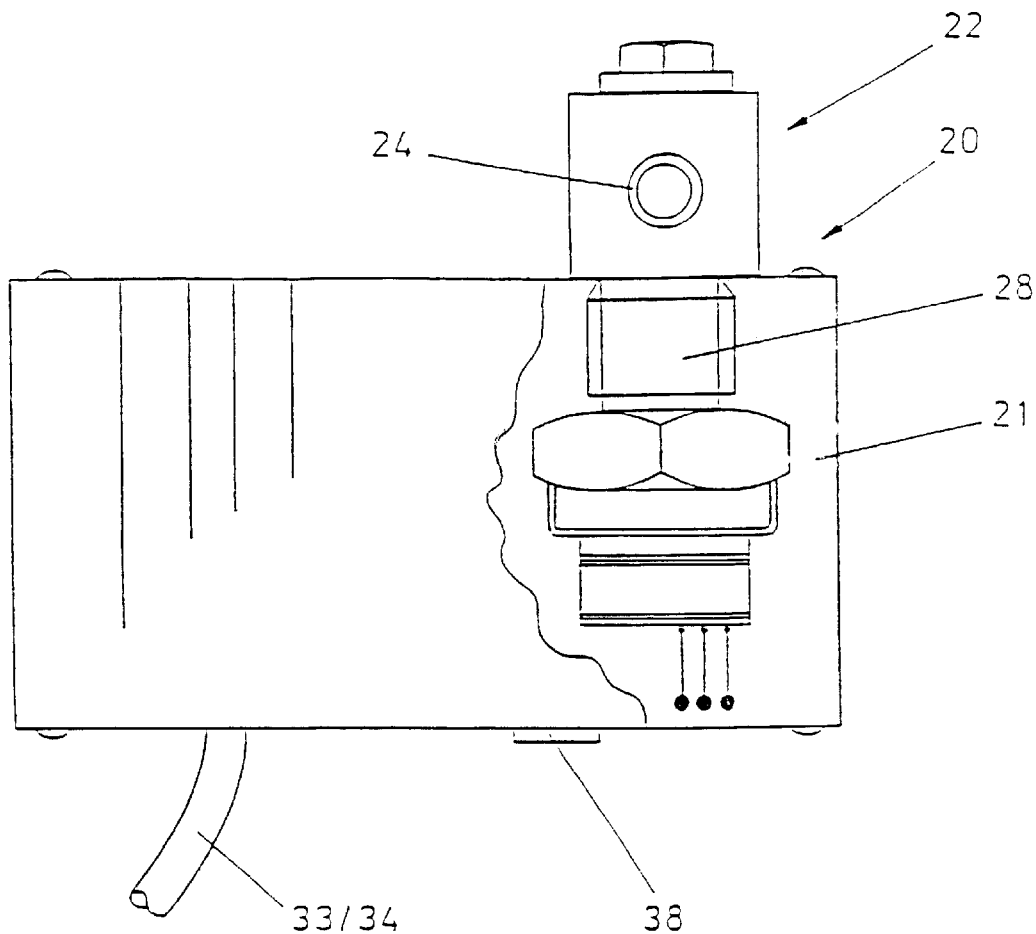
FIG. 2, is a part cut away view of control apparatus comprising the apparatus of FIG. 1.
Figure 3:
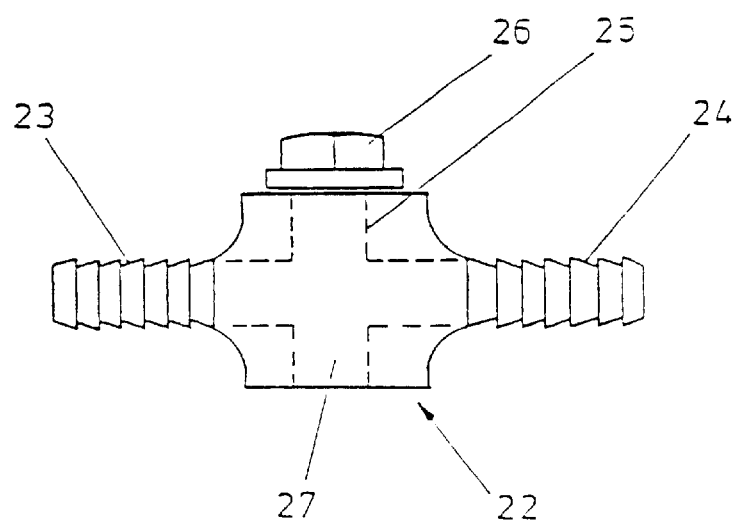
FIG. 3, is a side view of a connector comprising the apparatus of FIG. 2.
Figure 4:
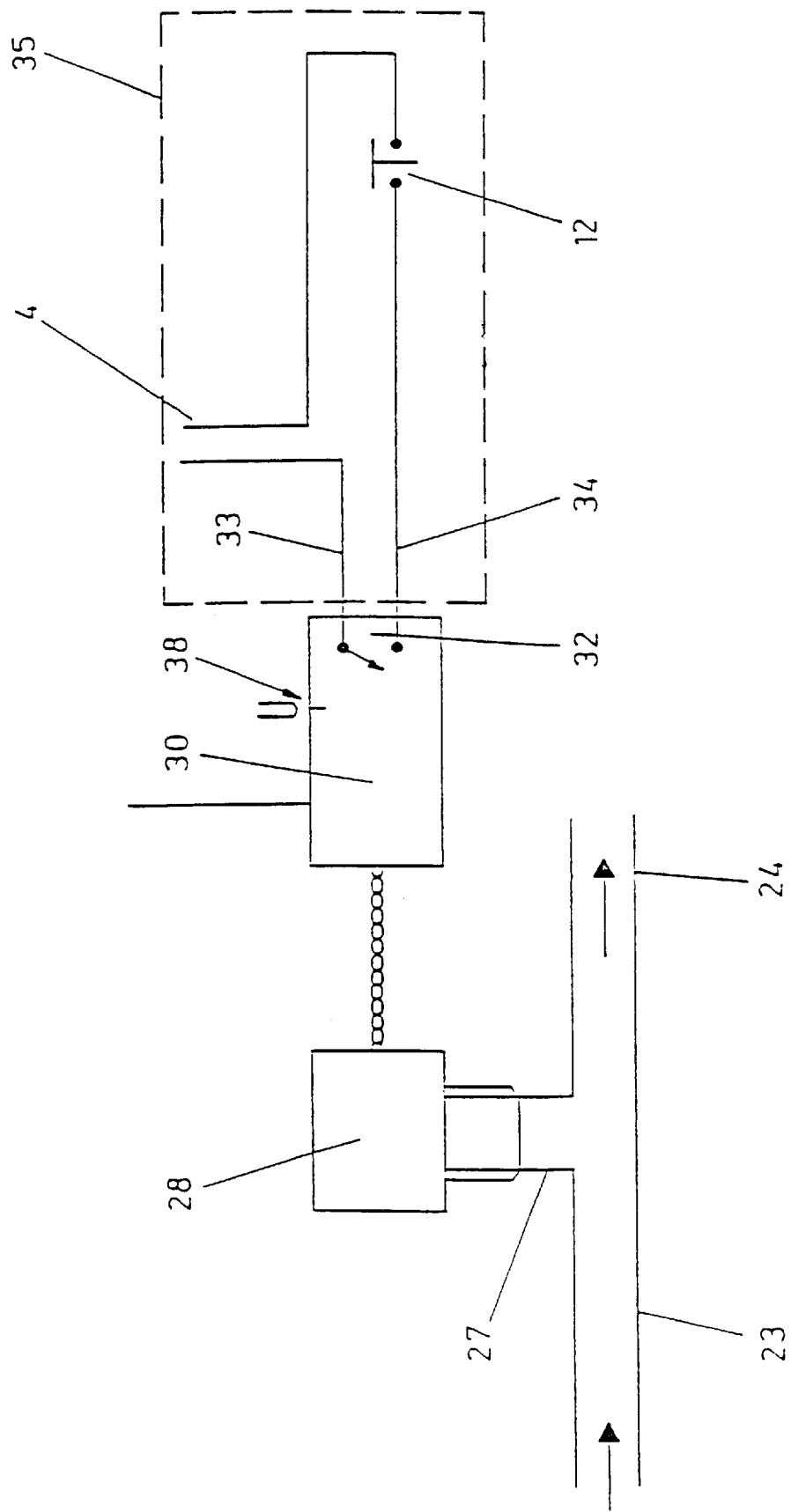
FIG. 4, is a schematic representation of the control apparatus of FIG. 2.

Referring to FIGS. 2 to 4, the regulator control unit 20 comprises a housing 21 having a gas line connector 22 having an upstream gas inlet 23, a downstream gas outlet 24, and a purging gas outlet 25, which may be selectively closed by a threaded plug 26 matingly engaging therewith. With plug 26 removed, a 'purging' gas line may be connected to outlet 25, to enable simultaneous 'purging' supply via outlet 25 and 'shielding' supply via outlet 24 to be provided from a common pressurised gas source. It is believed this is novel and inventive per se.

Connector 22 includes a passage 27 communicating with the diaphragm of an electronic thick film pressure sensor 28 housed within housing 21. A suitable such sensor is commercially available from Ellison Sensors International under the designation TSN PT18-2R. The gas pressure in gas line 3 is thus sensed by sensor 28 which produces an output signal proportional to the gas pressure sensed.

The sensor output signal passes to an electronic circuit 30 provided internally of housing 21. The electronic circuit to which the sensor 28 output is directed includes, in sequence, a rectifier, an amplifier, and a comparator integrated circuit which compares the sensor output with upper and lower threshold settings. If the level is above the upper threshold setting, or below the lower threshold setting, a relay is de-activated to open a switch 32 bridging connections 33,34 to the welding apparatus driver circuitry (loop 35 including driver 4 and welding gun trigger 12).

The electronic sensor is capable of producing a continuously variable output between a maximum and a minimum and does not simply act as an on/off gauge. The comparator circuitry is adjustable to alter the upper and lower threshold levels at which the welding apparatus cut out is initiated. This is typically achieved by means of a manually operable potentiometer 38. The adjustability of the apparatus enables versatility of use with variety of different welding apparatus with convenient adjustment of the threshold pressure settings as and when required. Typically, the pressure settings vary from 50 mb up to 500 mb.

Furthermore, the apparatus is fitted with a variable voltage regulator (not shown) to enable connection to range of voltage power supplies.

The regulator control unit is therefore suitable for retro-fit to existing welding apparatus, or incorporation into an integrated master control unit of welding apparatus. The adjustable threshold pressure levels and regulated voltage can be set at manufacture or adjustable in the field (particularly for retro-fit).

What is claimed is:

1. Welding control apparatus for welding using a pressurised welding gas, the apparatus including:
    i) a pressure sensor arranged to sense the pressure of the pressurised welding gas and produce a control output dependent upon the pressure level sensed;
    ii) a welding apparatus driver arrangement;
    iii) output connections for electrical connection to the welding apparatus driver arrangement; and,
    iv) a control arrangement for initiating a control signal to modify the status of the output driver connections when pressure of a predetermined level is sensed by the pressure sensor;

wherein (a) the pressure sensor is arranged to output a variable control output dependent upon the pressure level sensed; and (b) the control arrangement is arranged to initiate the outlet control signal at respective lower and upper threshold levels.

2. Apparatus according to claim 1, wherein the predetermined level at which the control signal is initiated by the control arrangement is variable.

3. Apparatus according to claim 1, wherein the control arrangement includes a comparator arranged to compare the sensed pressure level with the predetermined threshold pressure level.

4. Apparatus according to claim 3, wherein the comparator comprises electronic comparator.

5. Apparatus according to claim 1 further comprising a conduit for the welding gas, the conduit being in communication with the pressure sensor.

6. Apparatus according to claim 1, wherein the sensor comprises an electronic pressure transducer arranged to produce a variable electronic output dependant upon the pressure sensed.

7. Apparatus according to claim 6, wherein the electronic transducer comprises a thin film and diaphragm pressure transducer.

8. The apparatus according to claim 1, wherein the control arrangement includes an adjustment apparatus for adjusting the value of at least one of the threshold levels.

9. The apparatus according to claim 1, further comprising a variable voltage regulator permitting connection of the apparatus to a range of voltages.

10. The apparatus according to claim 8, further comprising a variable voltage regulator permitting connection of the apparatus to a range of voltages.

* * * * *